Aug. 17, 1965     J. E. T. WELLAND     3,201,037

TAXIMETERS

Filed July 19, 1963     4 Sheets-Sheet 1

INVENTOR

JOHN EDWIN THOMAS WELLAND

By Irwin L. Thompson

ATTY.

Aug. 17, 1965  J. E. T. WELLAND  3,201,037
TAXIMETERS

Filed July 19, 1963  4 Sheets-Sheet 4

INVENTOR
JOHN EDWIN THOMAS WELLAND
By Irwin S. Thompson
ATTY.

United States Patent Office 3,201,037
Patented Aug. 17, 1965

3,201,037
TAXIMETERS
John Edwin Thomas Welland, London, England, assignor to Geecen Limited, London, England, a British company
Filed July 19, 1963, Ser. No. 296,275
Claims priority, application Great Britain, Mar. 14, 1963, 10,138/63
4 Claims. (Cl. 235—30)

This invention relates to taximeters and its object is to provide simple and effective means for changing the rate of advance of a fare indicator, e.g. to provide an initial rate (commonly called a tariff) followed by a different rate (or second tariff) beyond an initial predetermined distance or travel and time when rate of travel of the vehicle is low or nil e.g. waiting time.

According to the present invention a taximeter comprises a rotary member, means for driving the rotary member alternately in accordance with distance of travel and time of waiting, a fare indicator, a fare indicator operating means, advance means for operating the latter with a succession of advance movements according to the rotation of the rotary member, control means driven in accordance with distance and time for controlling the rate of advance and for changing the rate of advance from one predetermined rate for first tariff to a different predetermined rate for second tariff after a predetemined amount of movement of said rotary member, said means for driving the rotary member including variable ratio toothed gearing in the distance part of the driving means and ratio changing means operatively connected with the rotary member according to time and distance to change said gearing to additionally vary the tariff for distance travelled.

By means of this invention the second tariff is changed (e.g. increased) not only in accordance with distance travelled and with time but the increased tariff for distance travelled can be selected to any required value according to the gearing ratios.

In a preferred form of the invention the rotary member is a cam, and the fare indicator operating means includes a lever which is lifted (away from the cam centre) and dropped alternately by the cam, and the control means is a stopping device which stops predetermined dropping movements during the low tariff period and permits a greater number of said dropping movements during high tariff period, the variable gearing being also changed at the end of the low tariff period.

Various construction forms of the invention will now be described by way of example with reference to the accompanying diagrammatic drawings wherein.

Figure 1:
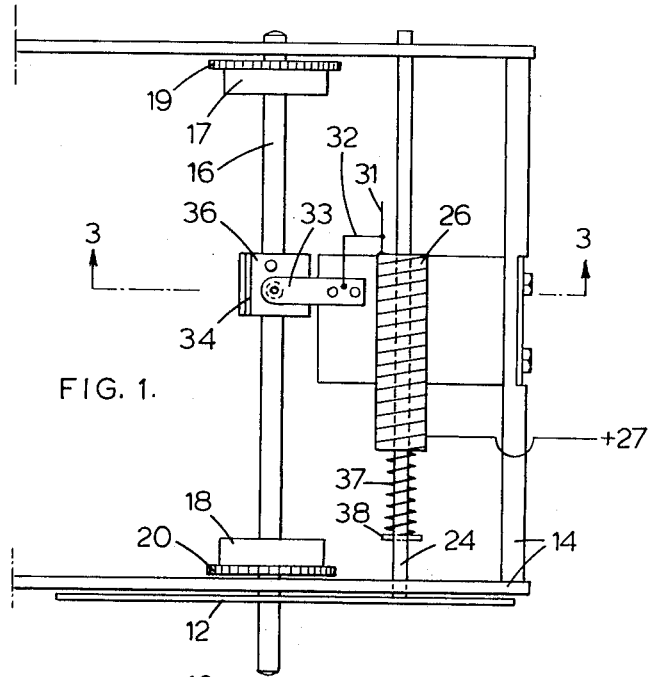
FIGURE 1 is a plan view of the relevant parts of a taximeter made in accordance with the invention showing only those parts which cause a different number of advance movements to be imparted to the fare indicating means in high tariff period than in low tariff period.
Figure 2:
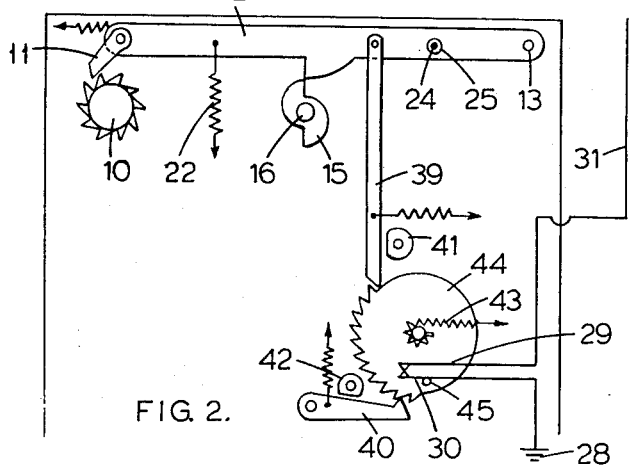
FIGURE 2 is an elevational view thereof.
Figure 3:
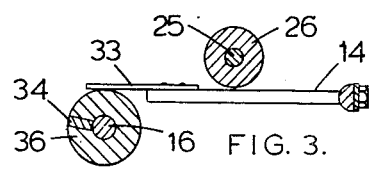
FIGURE 3 is a sectional view on line 3—3 on FIGURE 1.

Referring first to FIGURES 1, 2 and 3 the rotation of a ratchet wheel or drum 10 advances the fare indicating drums in known manner. Fare advance movements are applied to the wheel 10 by a pawl 11 carried by a lever 12 pivoted at 13 to the frame 14 of the taximeter. A rotary member 15 in the form of a two step cam is fixed on a shaft 16 that is driven by two uni-directional clutches 17, 18. Clutch 17 is driven by being fixed to a gearwheel 19 that is geared to a clockwork mechanism and clutch 18 is driven by being fixed to a gearwheel 20 that is geared to a distance drive device e.g. the vehicle gearbox. The shaft 16 is therefore driven alternately by both distance of travel and time occupied of the hired taxi. The lever 12 is raised by the steps of the cam 15 twice during each revolution of the shaft 16 and drops under the pull of a spring 22 so as to actuate the ratchet 10 at a rate suitable for the high tariff period. However those parts of the movements of the lever that effect advance movements of the fare indicating means are stopped during an initial fare period so that no fare increases are applied to the fare drums. After this initial period, during the same journey, alternate such parts of the movements of the lever 12 are prevented during a low tariff period, by controlling means including a locking member or rod 24 which can engage in a hole 25 in the lever 12. The rod 24 constitutes the core of a solenoid 26 which is energised by electric current supplied from a source 27. The current flows when the solenoid is earthed. This can be accomplished in the following way. First from an earth terminal 28 via a pair of switch contact arms 29, 30 and a conductor 31 (shown in both FIGURES 1 and 2). Second via a flexible contact arm 33 connected by conductor 32 to 31 and a strip of brass 34 which is fixed to the earthed shaft 16. The strip 34 is embedded in an insulating roll 36 which is fixed on the shaft 16 and contacts arm 33 immediately prior to the instant when lever 12 would normally fall over one of the steps of cam 15. A compression spring 37 on the locking rod 24 between the solenoid coil and an abutment 38 on rod 24 urges the rod to its locking position. The contacts 29, 30 are open in initial tariff period and in low tariff period and are closed in high tariff period so as to energise the solenoid continuously in the high tariff period thereby holding rod 24 retracted from lever 12 to allow the latter to drop at every step of the cam 15, i.e. twice per revolution of shaft 16 whereas during low tariff period the contacts 29, 30 are open and the rod 24 is retracted only once per revolution of shaft 16, i.e. each time strip 34 contacts arm 33. In order to close contracts 29, 30 during high tariff period a pin 45 is carried by a ratchet disc 44 having teeth engaged by a pawl 39 on lever 12. The pawl 39 rotates the disc 44 step by step until at the end of the low tariff period pin 45 contacts arm 30 and closes the contacts 29, 30 whereupon pawl 39 reaches a part of the disc 44 having no teeth so that further movements of pawl 39 do not rotate disc 44. The disc 44 is held by a non-return pawl 40. Pawls 39, 40 can be released by cams 41, 42 to permit return of disc 44 to zero position by spring 43.

The number of cam steps on the cam 15 may be varied as well as the number of contacts on the rotary insulating block, e.g. with three cam steps the lever may be allowed to fall once then miss two cam steps or actuate on two steps and miss one. Any reasonable number of cam steps may be provided according to the results required. For example the apparatus can be so arranged that the meter would register at 352 yards (or equivalent time or time and distance) after the predetermined initial charge then register at 704 yards, then miss registration at 1056 yards, register again at 1408 yards and 1760 yards and so on or vice versa, this being achieved with a three drop cam. In other words the apparatus would effect two fare registrations and miss one in rotation or could be arranged to effect one registration and miss two. The apparatus can be arranged to effect change of tariff when any predetermined change has been reached.

The solenoid rod may be brass over over one part of its length and steel over the remainder of its length to facilitate operation by the solenoid coil.

Figure 4:
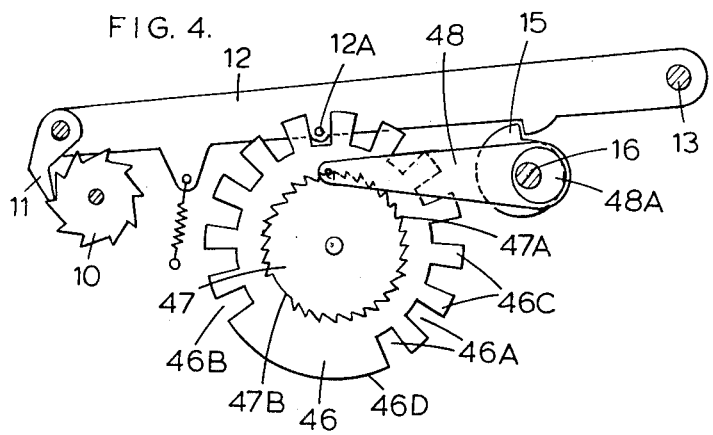
FIGURE 4 is an elevational view of an alternative construction.

In the alternative construction shown in FIGURE 4 a mechanical stopping device is provided instead of the electromagnetic device.

The cam 15 in this case has a single step.

The lever 12 has a pin 12A located over a rotary disc 46 that has a series of peripheral slots 46A including a final slot 46B with corresponding teeth 46C and a plain peripheral part 46D. The disc 46 is fixed to a ratchet wheel 47 having teeth 47A having a gap 47B. Wheel 47 is rotated step by step by pawl 48 operated by eccentric 48A on shaft 16. Each revolution of shaft 16 moves the ratchet wheel 47 by one tooth in clockwise direction. Over an initial fare period the pin 12A drops on to the plain part 46D so that fare indicators are not operated. Then further movements bring the slots 46A and teeth 46C alternately under the pin so that the lever 12 is permitted to drop at every alternate rotation of cam 15 during low tariff period. At the end of the low tariff period the gap 47B reaches the pawl 48 so that discs 46, 47 are not further rotated and at this time the end slot 46B is under the pin 12A so that the lever 12 operates for high tariff at every rotation of the cam 15.

Figure 5:
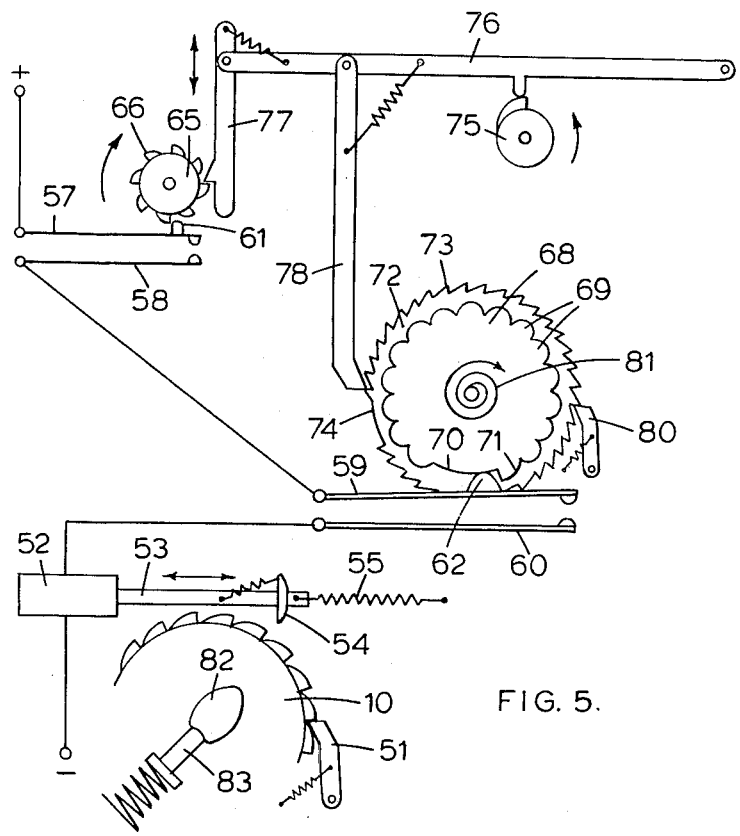
FIGURE 5 is an elevational view together with electrical diagram of a third constructional form thereof.

In the construction shown in FIGURE 5 the fare indicator means includes a toothed drum 10 the teeth of which are engaged by a non-return pawl 51. The drum actuates the usual fare indicator drums (not shown) and is driven by an electro-magnetic device in the form of a solenoid 52 having a movable core 53 which carries a pawl 54. When the solenoid is energised the core 53 moves to the left and the pawl 54 engages a tooth on drum 10 and applies a fare advance movement to it. When the current to the solenoid stops, the core is returned by a spring 55 and pawl 54 rides over the teeth of the drum 10. The solenoid is connected in an electric circuit which includes two switches comprising switch arms 57, 58 and 59, 60 having contacts and projections 61, 62. The projection 61 is engaged by a cam disc 65 having a series of peripheral teeth 66 which also serve as ratchet teeth. The projection 62 engages a cam disc 68 having peripheral projections 69, a gap 70 free from projections, and a final projection 71. The disc 68 is carried by a ratchet wheel 72 having ratchet teeth 73 having a gap at 74 free from teeth. A rotary cam 75 driven by the combined time and distance shaft operates a lever 76 so that this rises and drops. The lever carries a pawl 77 that engages ratchet teeth 66 and a pawl 78 that engages ratchet teeth 73. During an initial fare period switch 59, 60 is open because of the gap 70. At each drop of the lever 76, the pawl 77 turns disc 65 to close switch 57, 58 momentarily and pawl 78 turns disc 72 a distance equal to half the pitch of the projections 69 so that the projection 62 is depressed by a projection on one movement to close switch 59, 60 but on the next movement the projection engages between two projections so that switch 59, 60 opens. Thus during the predetermined low tariff period both switches are closed on alternate drops of the cam but one switch remains open during the other alternate drops. Thus a fare advance movement is effected on alternate drops of the lever. At the end of the low tariff period the projection 62 is engaged by the final projection 71 and gap 74 comes opposite to the pawl 78 so that the latter no longer rotates disc 72. A fare advance is then effected at each closing of switch 57, 58 i.e. at each drop of the lever 76.

Ratchet teeth 73 are also engaged by a non-return pawl 80. Pawls 51, 80, 78 are disengaged in the For Hire position and a spring 81 returns 68, 72 to the position shown. Cams such as 82 (one for each fare drum) serve for zeroising the fare drums under pressure of sping-loaded plungers such as 83.

Figure 6:
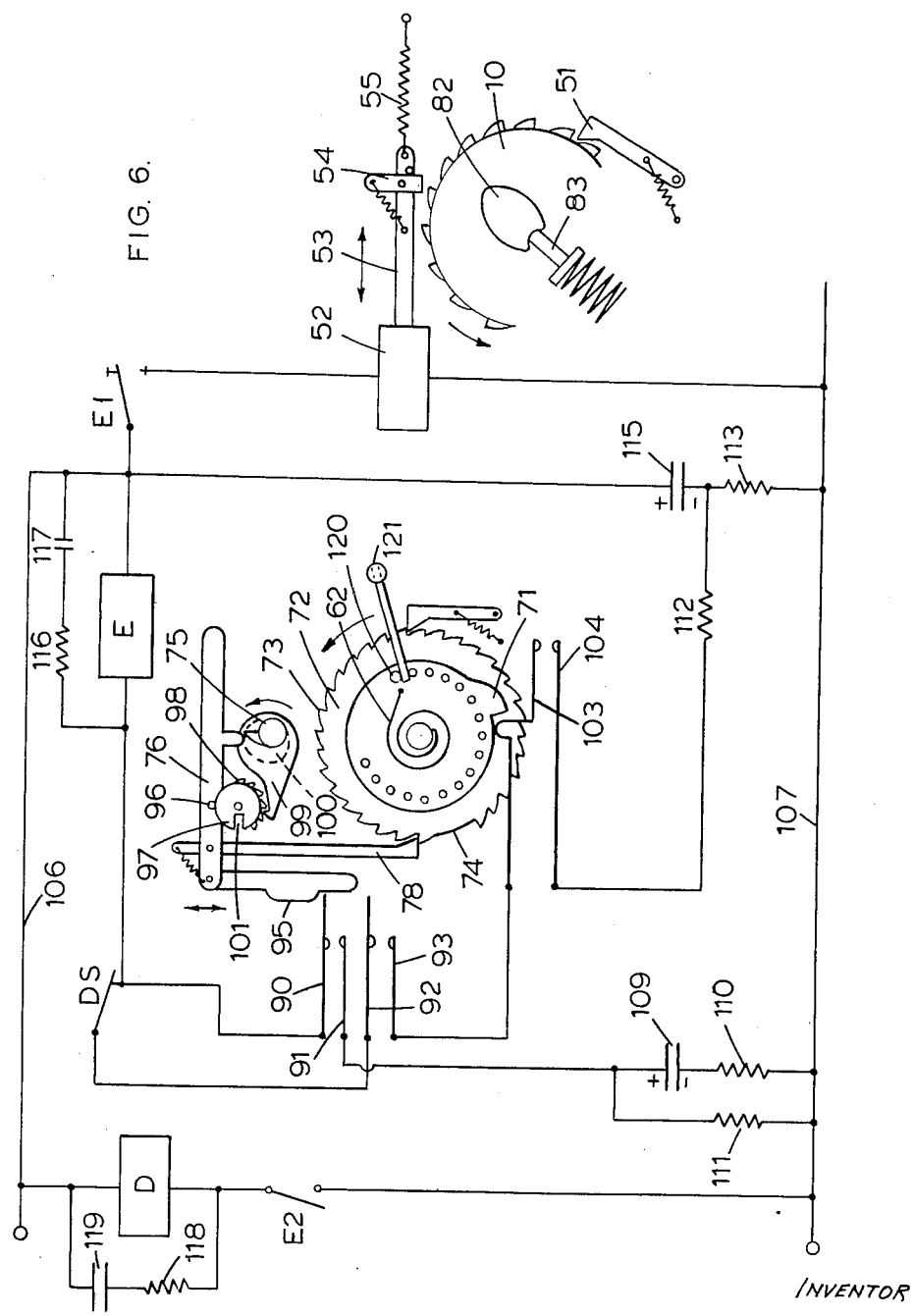
FIGURE 6 is an elevational view with electrical diagram of a fourth form thereof.

In the arrangement shown in FIGURE 6 the fare indicator is actuated by a solenoid. Parts 75, 76, 68, 72, 73, 74, 78, 10, 51, 52, 53, 54, 82, 83 are the same as in FIGURE 5. The solenoid is energised by electric current controlled by the following means. Two switches 90, 91 and 92, 93 are arranged adjacent each other with arms 90, 92 projecting into the path of a cam arm 95 carried by lever 76. A pin 96 on lever 76 seats on a disc 97 that has ratchet teeth 98 driven by pawl 99 from an eccentric 100 on cam 75. The disc 97 prevents fall of 76 during the predetermined initial period. The disc 97 has a peripheral slot 101 into which pin 96 can drop at the end of the initial period allowing lever 76 and cam arm 95 to have a sufficient movement during each drop so that at each drop of lever 76 switch 90, 91 is first closed and opened and immediately thereafter the switch 92, 93 is closed. A further switch 103, 104 is open during initial fare period and during low tariff period and is held closed by step 71 during high tariff period. A relay coil E is in series between a positive line 106 and a negative line 107 connected to a source of electrical D.C. supply and in a circuit which includes switch 90, 91 capacitor 109 (e.g. 100 mfd.) and a resistor 110 (e.g. 47 ohms). In parallel with 109, 110 is a resistor 111 of for example from 5 k. to 5 megohms. In parallel with 90, 91, 109 and 110 is a circuit which includes a switch DS, the second advance switch 92, 93, switch 103, 104, resistor 112 (e.g. 47 ohms) and resistor 113 (e.g. 5 k. to 5 megohms). A capacitor 115 is disposed between 112, 113 and the positive line 106. A resistor 116 (e.g. 47 ohms) and capacitor 117 (e.g. 100 mfd.) are shunted across the relay E and the latter controls two switches E1 and E2. Switch E1 is in series with the solenoid 52 connected across 106, 107, and switch E2 is connected with a relay coil D across 106, 107. The relay coil D is shunted by resistor 118 (e.g. 100 ohms) and by capacitor 119 (e.g. 100 mfd.) and controls switch DS.

In operation disc 97 rotates, and after the initial predetermined period the slot 101 moves below pin 96. Then, when lever 76 drops, the pin 96 enters the slot 101 and the cam arm 95 closes 90, 91 and then closes 92, 93. When 90, 91 is closed the capacitor 109 (normally discharged via resistor 111) draws current via relay E. This closes switch E1 and the solenoid 52 actuates the fare indicator drums. Simultaneously switch E2 closes. Capacitor 109 completes its charge as 95 moves past 90, and switch 90, 91 opens and 92, 93 also close but at this time are inoperative because third switch 103, 104 is open. Opening of relay switch E1 is delayed by the capacitor 117. This operation continues during low tariff period until switch 103, 104 is closed by step 71. The negative pole of capacitor 115 (normally kept charged via 113) is now applied through 103, 104 to switch 92, 93, which when closed by cam arm 95 is applied to switch DS still open while relay E is actuated because relay D is energised when switch E1 and E2 are closed. When relay switches E1 and E2 open, and the delay capacitor 119 has discharged sufficiently, relay switch DS closes and capacitor 115 discharges into relay E. The solenoid 52 thereby receives a second impulse at each drop of lever 76. Resistors 110, 112 serve to limit current surge.

Any of the above described constructions can be altered if desired so that the low tariff rate follows the high tariff rate.

Drum 72 is adjustable in relation to drum 71 in order to vary the low tariff period. The adjustment may be effected by placing stop pin 120 in any of a series of holes 122. The stop pin engages an abutment 121 in the For Hire position.

Figure 7:
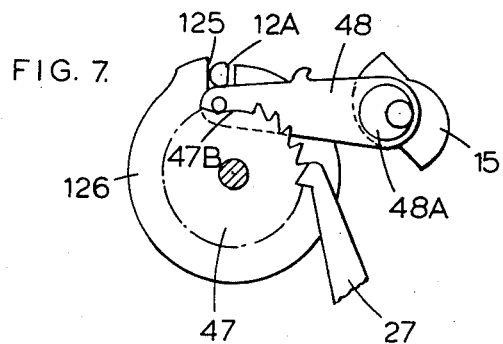
FIGURE 7 is an elevational view of a fifth construction.

FIGURE 7 shows a modification of FIGURE 4 in which the pin 12A engages in a single slot 125 in a disc 126 which is driven step by step by pawl 48 and eccentric 48A until gap 47B reaches the pawl whereupon the pawl 48 oscillates disc 126 so that pin 12A on lever 12 falls, alternately into slot 125 and on to the periphery of the disc. For high tariff disc 47 is locked by a pawl 127 operated by a suitable cam so that slot 125 remains below the pin 12A.

According to the present invention there is applied to any of the constructions of FIGURES 1 to 7 an additional device for changing the ratio between the distance drive device (vehicle gearbox) and the gearwheel 20 (FIGURE 1). This addition is illustrated in FIGURE 8 which shows the addition combined with the arrangement of FIGURE 7 and it will be apparent that the combination shown in FIGURE 8 can be readily modified to replace the device of FIGURE 7 therein by any of the modifications shown in FIGURES 1 to 6.

Figure 8:
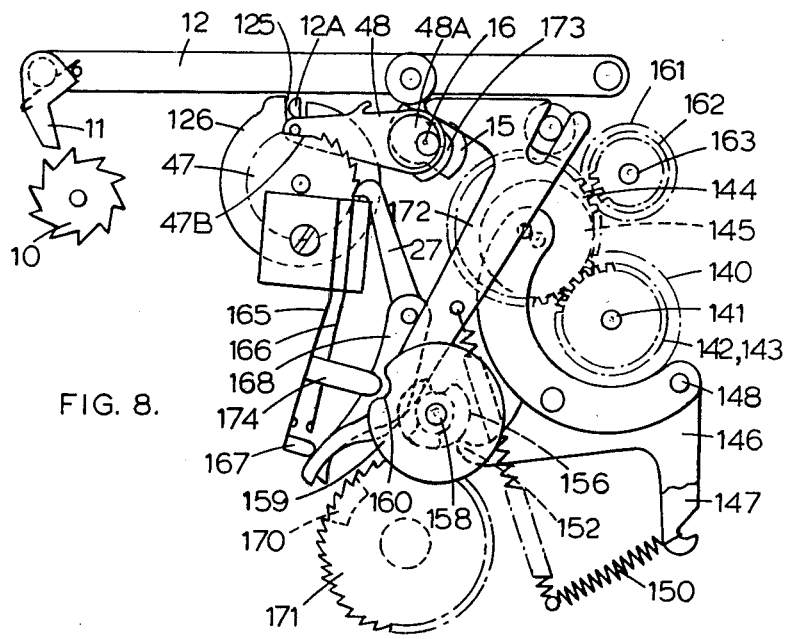
FIGURE 8 is an elevational view showing means for changing the ratio of drive according to distance travelled, which means can be used in conjunction with any of the means shown in FIGURES 1 to 7.

In FIGURE 8 the high tariff can be a multiple of low tariff for waiting time but any relation to low tariff for distance traveled. The object of the construction described in FIGURE 8 is to effect an increase, or decrease, in the fare registered on the taximeter after a predetermined period or distance, combined with automatic change in both time and distance rates of charge. The meter is of the kind shown in British Patent 956,704 i.e. having a control cam shaft driven by an electric motor when set in operation by the driver so as to produce the conditions For Hire, Hired and Stopped. In the arrangement of FIGURE 8 the parts 27, 47, 126, 48 correspond to the similarly numbered parts of FIGURE 7. In addition a gearwheel 140 is driven according to distance travelled and this gearwheel is fixed on a spindle 141 which carries two gearwheels 142, 143 which may be the same size as each other. These gearwheels are engaged respectively by two gearwheels 144, 145 on two levers 146, 147 pivoted at 148 and urged towards engagement by springs 150. The levers have arms 152, engaging gear change cams 156, on a main shaft 158 which is driven by the usual electric motor of the taximeter. The main shaft 158 is the same as shaft 27 in British Patent 956,704. The motor is part of the normal "push button" taximeter of British Patent 956,704 and serves to turn the taximeter parts from their "For Hire" positions to "Hired" and then to "Stopped." This mainshaft 158 also carries a disc 159 of insulating material having a peripheral notch 160. The gearwheels 144, 145 alternately drive gearwheels 161, 162 on a shaft 163 which is operatively connected to the distance drive wheel 20 (FIGURE 1) of the time and distance shaft 16. The two trains of gears 143, 145, 161 or 142, 144, 162 can have any required gear ratio required for low tariff and high tariff. The high tariff gear is brought into operation (and the low tariff gear disengaged) by a turn through 90° of the mainshaft 158 and this is accomplished by including a pair of electric contact arms 165, 166 in the motor circuit. The longer arm 165 carries an insulating block 167 engaged by a pivoted arm 168 which can drop into a recess 170 in the periphery of a toothed wheel 171 that is driven step by step by a pawl 172 actuated by an eccentric 173 on the time and distance shaft 16. Also a projection 174 on arm 165 seats normally on the periphery of a disc 159 of insulating material but can enter the recess 160 at a suitable moment when high tariff is required. When the taxi driver pushes the motor pushbutton at the position FOR HIRE the motor revolves shaft 158 and at the same time the levers 172-168 come into mesh with the teeth of gear 171, and the insulated disc 159 revolves until the cut-away part 16 is directly opposite the lifting arm 174 (as shown), with only the insulated part 167 resting on the lever 168, 174 being outside the circumference of disc 159 well clear of 160. When the fare is recording through the gearing the shaft 16 is driven anti-clockwise, with the eccentric 173 lifting the lever 172 until it engages one tooth of gear 171, and pushes this gear in an anti-clockwise direction one tooth at a time when allowed to do so by the position of the eccentric 173. During that time the lever 168 only acts as a retaining pawl for gear 171 which is under spring tension. Thus, when the fare recording is operating, the lever 172 actuates the gear 171 tooth by tooth, each of these teeth being the equivalent of a fare increment or fraction of a mile or period of time, during the lower fare period to a predetermined position. When the lever 168 is fiinally allowed to fall into the depression 170, it in turn permits the contcat control projection 174 to enter into the recess 160. This movement to the right is by reason of the springiness of contact blade 165; when the preceding events take place, the contacts on blades 165–166 make contact and causes the motor to be energised. This turns shaft 158 to turn disc 159 until the recess 160 comes to rest at 90° offset from the projection 174. By this movement of the disc 159 the projection 174 has been lifted and has broken contact between 165 and 166, thus bringing the motor to a standstill until manually operated by the push-button. Whilst this has been happening, the original lower tariff "distance side" lever 152 was also disengaging ratio gearing via cams 156, allowing a new ratio gearing to take control of the distance through the cams 156 the lever 152 having operated under spring 150. It can thus be seen why when using FIGURE 8 in conjunction with any of the arrangements of FIGURES 1 to 7, it is possible to obtain a different distance ratio other than the second ratio produced by the devices of FIGURES 1 to 7 after the predetermined distance, and yet retain said second ratio for the time side of the mechanism; and also this apparatus can double the time recording without necessarily doubling the distance recording. For example, the mechanism of FIGURES 1 to 7 may double the tariff both on distance and time while the distance rate can be additionally varied by changing the gears 144, 145.

Three trains of gears may be provided if desired to obtain three tariffs with means for turning the cams to bring the required ratios into use at the required moments.

I claim:

1. A taximeter having a rotary member, first drive means for driving the rotary member in accordance with time, second drive means for driving the rotary member in accordance with the distance travelled by the vehicle, a fare indicator, a fare indicator operating means, advance means for operating the latter with a succession of advance movements according to the roatation of the rotary member, first control means driven by said rotary member in accordance with distance and time for changing the rate of advance from one predetermined rate for first tariff to a different predetermined rate for second tariff after a predetermined amount of movement of said rotary member, said means for driving the second drive means including variable ratio toothed gearing, ratio changing means to change said gearing to additionally vary the tariff for distance travelled, and control means operatively connected with said rotary member to effect change of said ratio changing means after a predetermined rotation of said rotary member.

2. A taximeter as claimed in claim 1 wherein the ratio changing means includes electric motor driven cam means, electric contact means to bring about completion of the motor circuit thereby driving the cam means to change the ratio of the gearing, and means driven by the electric motor for breaking the motor circuit after the required change of ratio.

3. A taximeter having a rotary member, means for driving the rotary member alternately in accordance with distance of travel and time of waiting, a fare indicator, a lever operatively connected with the rotary member whereby the latter is oscillated, means whereby the oscillations of the lever cause advance movements of the fare indicating means, a stopping device for stopping predetermined fare advance movements of the lever, means for operatively connecting the stopping device with the rotary member, whereby said stopping device is brought into operation to permit a greater proportion of fare advance movements in second tariff period than in first tariff period, said means for driving the rotary member including variable ratio toothed gearing in the distance part of the driving means, means including an electric motor for operating the taximeter from the "For Hire" condition, to the "Hired" condition, cam means driven by the motor for changing the ratio of said gearing, electric means including electric contacts for completing the motor circuit for driving the cam means, means operatively connected with the rotary member for causing said contacts to meet at a predetermined moment of operation, and means driven by the electric motor for separating said contacts after the required change of ratio.

4. In a taximeter having a control shaft, cams on the control shaft for bringing about the conditions For Hire, Hired, Stopped, an electric motor for driving the control shaft and fare indicating means, the provision of electric means including electric contacts for controlling energising of the motor, a projection for effecting opening and closing of the contacts, a disc on the control shaft for controlling the movement of the projection, a rotary member, means for driving the rotary member alternately according to time and distance, said means including variable speed gearing for transmitting drive according to distance, a lever operatively connected with the rotary member whereby the latter is oscillated, means whereby the oscillations of the lever cause advance movements of the fare indicating means, a device drivably connected with said rotary member and operative for changing the ratio of said oscillations and the advance movements applied to said fare indicating means, means driven by the rotary member and also controlling the movement of the projection to effect energising of the motor after a predetermined amount of rotation of the rotary member, and means actuated by said cams and effecting change of ratio of the variable speed gearing when the motor is thus energised.

References Cited by the Examiner
UNITED STATES PATENTS
2,428,080  9/47  Horn _____ 235—30
3,012,712  12/61  Haupt _____ 235—30

FOREIGN PATENTS
1,058,290  5/59  Germany.

LEO SMILOW, *Primary Examiner.*